United States Patent
Mosciatti et al.

[11] Patent Number: 5,959,384
[45] Date of Patent: Sep. 28, 1999

[54] BRUSHLESS MOTOR HOUSING ASSEMBLY

[75] Inventors: Roger Mosciatti, Coram; Robert Medina, Selden; Roy Diers, Commack, all of N.Y.

[73] Assignee: MFM Technology, Inc., Ronkonkoma, N.Y.

[21] Appl. No.: 09/090,939

[22] Filed: Jun. 5, 1998

Related U.S. Application Data

[60] Provisional application No. 60/077,882, Mar. 13, 1998.
[51] Int. Cl.[6] .................................................. H02K 49/00
[52] U.S. Cl. ................................. 310/92; 310/93; 310/95
[58] Field of Search .................................. 310/92, 93, 95, 310/40 R, 103, 77

[56] References Cited

U.S. PATENT DOCUMENTS

| | | | |
|---|---|---|---|
| 4,228,384 | 10/1980 | Arnold, Jr. et al. | 310/268 |
| 4,624,884 | 11/1986 | Harada et al. | 428/218 |
| 5,369,322 | 11/1994 | Maruyama et al. | 310/39 |
| 5,519,266 | 5/1996 | Chitayat | 310/12 |
| 5,686,769 | 11/1997 | Stephany et al. | 310/64 |
| 5,689,994 | 11/1997 | Nagai et al. | 310/80 |
| 5,723,917 | 3/1998 | Chitayat | 310/12 |
| 5,777,402 | 7/1998 | Chitayat | 310/12 |
| 5,783,877 | 7/1998 | Chitayat | 310/12 |

*Primary Examiner*—Clayton LaBalle
*Assistant Examiner*—Joseph Waks
*Attorney, Agent, or Firm*—Lane, Aitken & McCann

[57] ABSTRACT

A motor, encoder/resolver, and/or dynamic brake assembly in which the dynamic brake, when part of the assembly, is mounted on a rear cover plate of a modular housing for the auxiliary components. When a resolver or encoder is part of the assembly, the motor shaft extends only a short distance beyond the resolver/encoder housing module; far enough to be engaged by the armature of the dynamic brake if the brake is part of the assembly. In an assembly that does not use a dynamic brake, the same rear cover plate is used to close the encoder/resolver housing module.

4 Claims, 5 Drawing Sheets

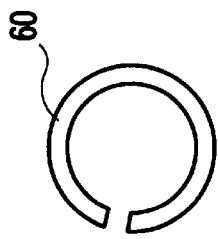
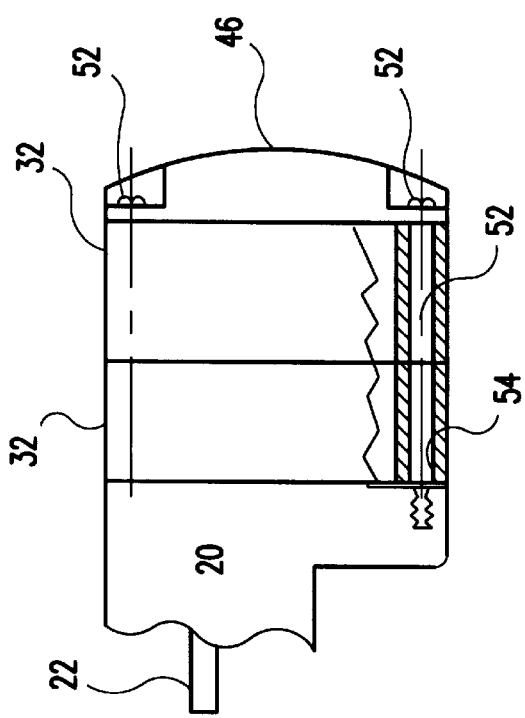
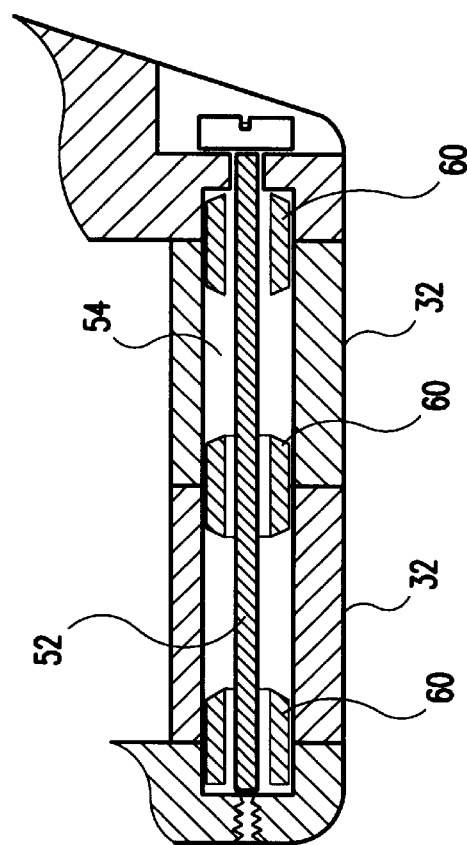
FIG. 5
FIG. 6
FIG. 7

BRUSHLESS MOTOR HOUSING ASSEMBLY

This application is a continuation of provisioned application No. 60/077,882 filed on Mar. 13, 1998.

BACKGROUND OF THE INVENTION

1. Field of the Invention

This invention relates to an improved assembly of a brushless motor in combination with a encoder/resolver, and/or dynamic brake, and more particularly to a modular assembly that facilitates customization of motor systems in the field from a small number of different, easily assembled components.

2. Description of the Prior Art

FIG. 1 illustrates a typical prior art brushless motor assembly. A brushless motor 10 has a drive shaft 12 extending from one end of the motor and an extension 13 of shaft 12 extending from the other end. One or more optional components (e.g. optical encoder, resolver, and/or dynamic brakes) are secured to the extension shaft 13; specifically, a shaft angular position encoder such an optical encoder 12 as shown in FIG. 1, or a resolver (not shown) and a dynamic brake 16. In this typical prior art assembly, the dynamic brake 16 is mounted on a platform wall 18, which separates the dynamic brake housing 19 from the encoder/resolver housing 21. The motor shaft extension 13 extends through and is attached to the brake 16. While the prior assembly is only broadly illustrated here, those skilled in the art will appreciate that it is not practical for distributors to custom assemble the optional components to meet a customer specification due to the complexity of the assembly and the relatively large number of different components which would have to be kept in stock. Further, the encoder and/or resolver cannot be repaired without removing first the dynamic brake and then the dynamic brake platform wall to which it is mounted.

SUMMARY OF THE INVENTION

An object of this invention is the provision of a brushless motor, shaft position encoder, and dynamic brake assembly than can be easily assembled and disassembled in the field from a limited set of components.

Briefly, this invention contemplates the provision of a motor, encoder/resolver, and/or dynamic brake assembly in which the dynamic brake, when part of the assembly, is mounted on a rear cover plate of a modular housing for the auxiliary components. When a resolver or encoder is part of the assembly, the motor shaft extends only a short distance beyond the resolver/encoder housing module; far enough to be engaged by the armature of the dynamic brake if the brake is part of the assembly. In an assembly that does not use a dynamic brake, the same rear cover plate is used to close the encoder/resolver housing module.

BRIEF DESCRIPTION OF THE DRAWINGS

The foregoing and other objects, aspects and advantages will be better understood from the following detailed description of a preferred embodiment of the invention, in which:

FIGS. 5, 6 and 7 are various views of a screw clamping mechanism for joining together component parts of the motor assembly.

DETAILED DESCRIPTION OF A PREFERRED EMBODIMENT

Figure 1:
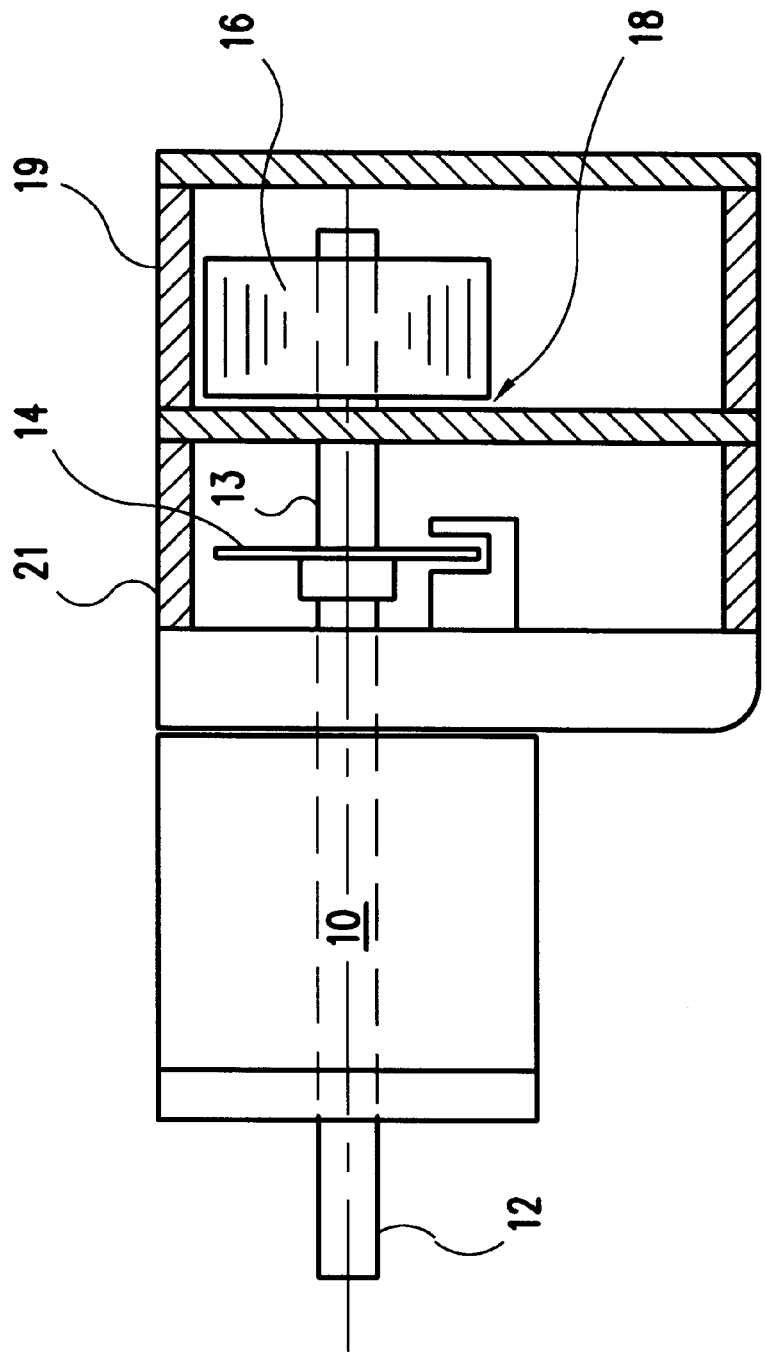
FIG. 1 is a partial sectional view of a prior art motor assembly, which includes a brake.
Figure 2:
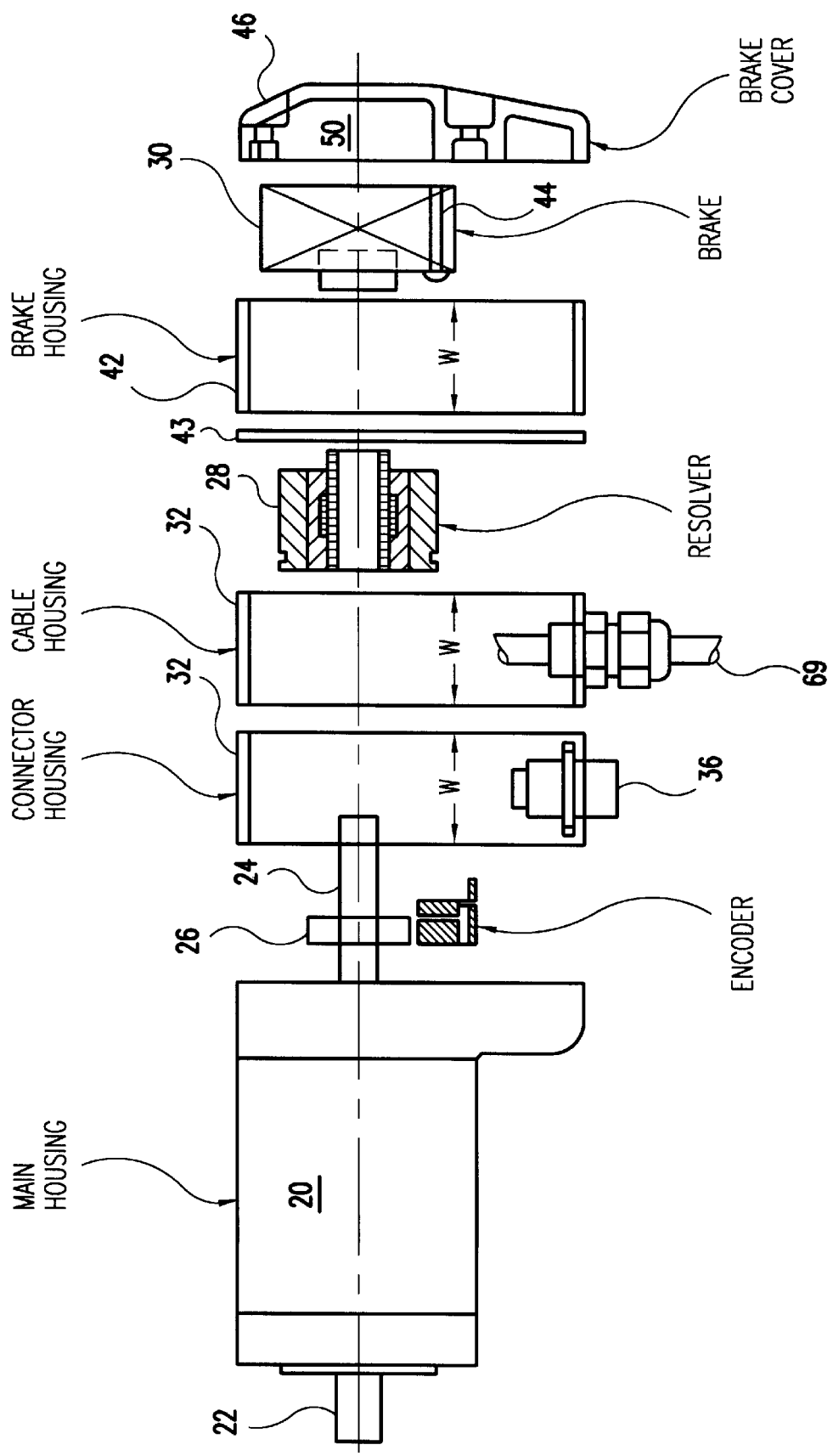
FIG. 2 is an exploded, sectional view of a motor assembly in accordance with the teachings of this invention.
Figure 3:
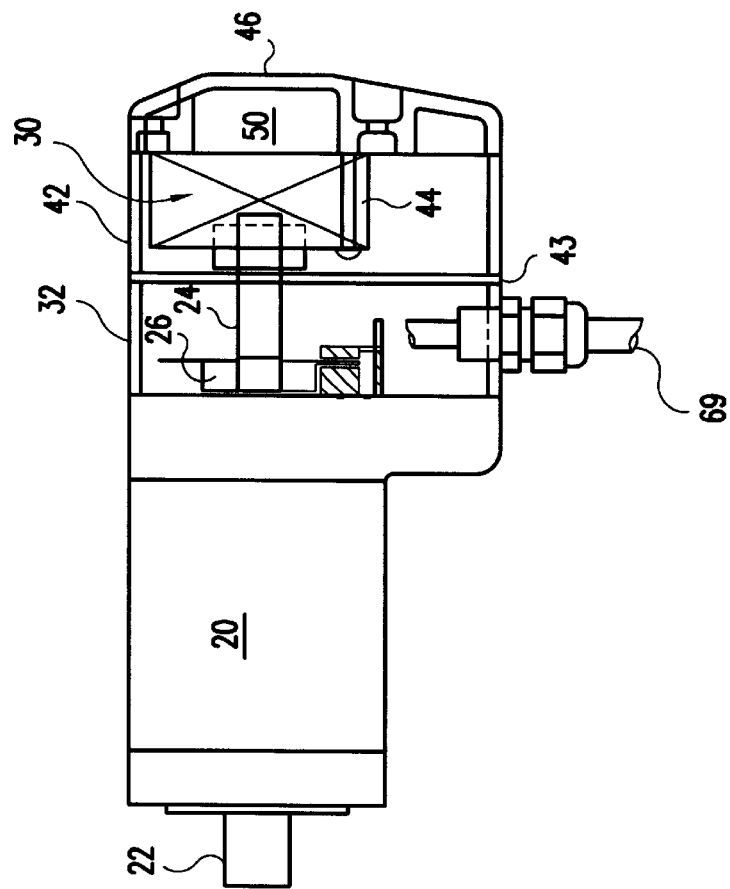
FIG. 3 is a partial sectional view of the assembly with a brake.
Figure 4:
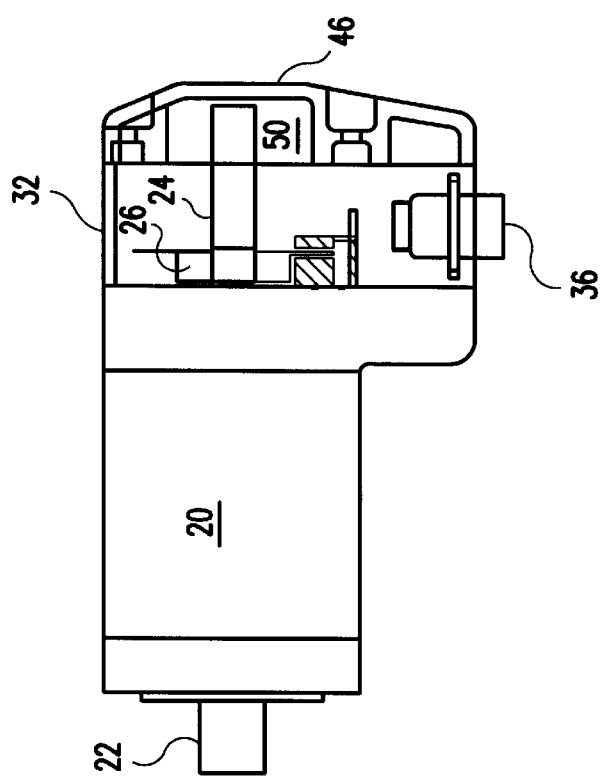
FIG. 4 is a partial sectional view similar to FIG. 3 without a brake.

Referring now to FIGS. 2, 3 and 4 a permanent magnet, brushless motor is enclosed in motor housing 20 and has drive shaft 22 extending from one end of the motor housing 20 and an extension 24 of the drive shaft 22 to which auxiliary components can be attached, extends from the other end of the motor housing 20. The auxiliary components include shaft position encoder 26 (e.g., an optical encoder)), a resolver 28, and a dynamic brake 30, all standard, commercially available components. An encoder/resolver housing module 32 is a generally cylindrical enclosure and comes in two configurations; with connectors 36 or leads 69.

A dynamic brake housing 42 is also generally cylindrical and fits against the encoder/resolver housing 32 when it is used. Here it will be appreciated that width "W" of each housing is advantageously the same, and the brake housing module 42 can be used alone to house the dynamic brake when it is the only auxiliary device attached to the motor shaft in the assembly. A diaphragm 43 with a sticky side facing the brake is used to prevent particles from the dynamic brake entering the encoder/resolver housing. Machine screws 44 (only one shown) secure the dynamic brake rear cover plate 46, which plate has a recess 50 that is deep enough to enclose the motor shaft when a dynamic brake is not part of the assembly, as shown in FIG. 4. That is, the width "W" of one of the modular housings plus the depth of the recess slightly exceeds the length of the extension 24 motor shaft.

Referring now to FIGS. 5, 6 and 7. Because the dynamic brake is secured to the end cover 46, the dynamic brake, when engaged, exerts a force on the end cover tending to rotate it about the motor shaft. For this reason, the housing modules and the back plate are preferably jointed together and to the motor housing, by means of screws 52 which pass through bores 54 in the housing modules and the end cover and screw into threads tapped into the motor housing. Roll pins 60, which act as springs, are used advantageously to prevent relative rotational motion of the housing components. Although small bosses on the housing modules and end plate could be used to prevent relative rotational motion, the roll pins allow the housing surfaces which are to engage one another to be machined flat, providing a cost saving.

Figure 8:
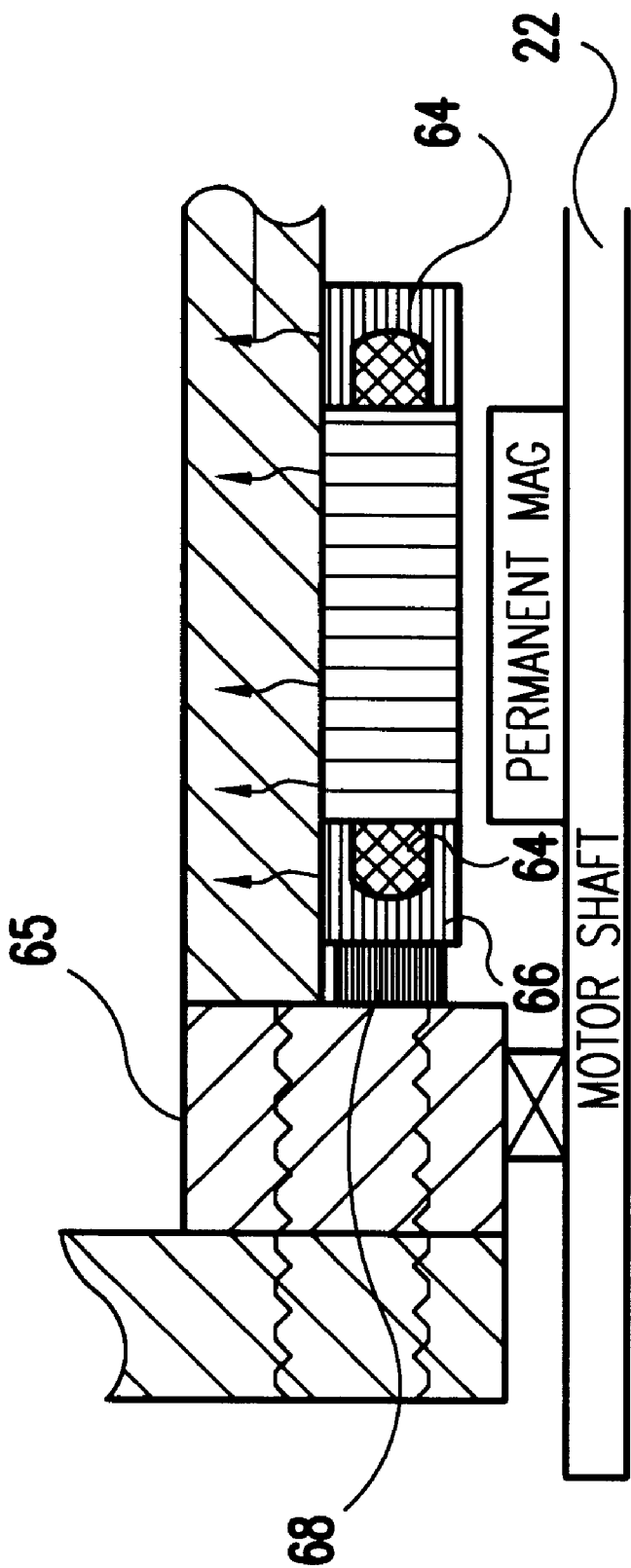
FIG. 8 is a sectional view of the motor assembly showing the end turns of the stator coils potted in a thermally conducted resin with thermally conductive resilient pads providing a heat conductive path between the potted end turns and the front plate of the motor housing.

FIG. 8 shows the use of a "thermal bridge" for removing heat from the end turns of a brushless motor. A stator assembly 63 which may be generally of a conventional design, has a plurality of coils with end turns 64 potted in thermal resin to form bridge 66 which extends partially across the gap between the end coil and a wall 65 of the motor housing. Here it will be appreciated that the length of the potted thermal bridge 66 will depend upon the geometry of a particular brushless motor. Because of practical limitations on production tolerances, the nominal length of the bridge is necessarily shorter than the nominal length of the gap, and a compressible, resistant, pad 68 of a heat conducting material is inserted between the end of the bridge and a wall of the structure which houses the motor.

While the invention has been described in terms of a single preferred embodiment, those skilled in the art will recognize that the invention can be practiced with modification within the spirit and scope of the appended claims.

Having thus described my invention, what I claim as new and desired to secure by Letters Patent is as follows:

1. A brushless permanent magnet motor with a rotating motor shaft, comprising in combination;

a main motor housing with a drive portion of said motor shaft extending from one end of said housing and an auxiliary component portion of said motor shaft extending from an other end of said housing;

an encoder/resolver housing removably secured to said motor housing with said auxiliary component portion of said motor shaft passing through said encoder/resolver housing and extending beyond said encoder/resolver housing;

a dynamic brake housing removably secured to said encoder/resolver housing with said auxiliary component portion of said motor shaft extending only partially into said dynamic brake housing;

a back cover removably secured to said dynamic brake housing and alternatively to said encoder/resolver housing;

said back cover including means for securing a dynamic brake to said back cover and to provide an end closure both when secured to said dynamic brake housing and when secured to said encoder/resolver housing.

2. A brushless permanent magnet motor as in claim 1 wherein said main motor housing, said encoder/resolver housing, said dynamic brake housing, and said back cover are removably secured together by bolts.

3. A brushless permanent magnet motor as in claim 2 wherein said bolts pass through bores in said main motor housing, said encoder/resolver housing, said dynamic brake housing, and said back cover.

4. A brushless permanent magnet motor as in claim 3 further including roll pins in said bores to prevent relative rotation of the housings.

\* \* \* \* \*